3,078,250
REDUCING FLAMMABILITY OF POLYPROPYL-
ENE BY BLENDING THE SAME WITH TITANIUM
DIOXIDE
William E. Thompson, Wallingford, Pa., assignor to Sun
Oil Company, Philadelphia, Pa., a corporation of New
Jersey
No Drawing. Filed May 14, 1957, Ser. No. 658,938
5 Claims. (Cl. 260—41)

This invention relates to new compositions of matter and methods for their preparation. More particularly, the present invention relates to new compositions comprising titanium dioxide compounded with certain polymers of propylene.

Propylene has heretofore been polymerized to relatively low molecular weight liquids or soft amorphous solids through the use of polymerization catalysts such as aluminum trichloride, boron trifluoride, and the like. Propylene can be polymerized to relatively high molecular weight solid polymers by contacting propylene with a dispersion of titanium trichloride and an activator such as aluminum triethyl maintained in an inert, liquid reaction medium. Generally such processes produce polymers having molecular weights of above about 5,000 and usually within the range of from about 50,000 to 300,000. A proportion of the solid products obtained with the mentioned catalyst appears crystalline, i.e., exhibits a crystalline structure by X-ray analysis. The crystalline polymer is relatively insoluble in the usual hydrocarbon solvents, such as the paraffins, including for example, the pentanes, hexanes, octanes, decanes, and the like, and is insoluble in oxygen-containing organic solvents such as aldehydes and ketones. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess properties which make them suitable for many applications, they are frequently discolored especially after being subjected to elevated temperatures such as are used in molding, extrusion, or other fabrication processing, which renders them unsuitable for many other applications. For example, polypropylene products formed by molding or extrusion may be colored from yellow to dark brown, or they may appear gray possibly due to the presence of residual materials from the catalyst used which were not removed in the processing. Polypropylene is furthermore relatively light and hence is not suitable for preparing hard, heavy articles of manufacture. Also, propylene is flammable and readily burns, so that its use is further limited.

An object of the present invention is to provide new compositions of matter, composed principally of polypropylene, which are white and which remain white after processing. Another object is to provide a composition composed principally of polyproylene which is relatively hard and heavy, but which can be readily fabricated into articles of manufacture. An additional object is to provide a new composition of matter which is not flammable and which contains polypropylene as its major component. A further object is to provide a process for the preparation of the new compositions of matter. Other objects and their achievement in accordance with the present invention will be apparent hereinafter.

It has now been found that by compounding a limited quantity of titanium dioxide with polypropylene, as hereinafter described, a white polymer product is obtained. It has been further found that such polymers are incombustible. By the addition of a larger quantity of titanium dioxide into the polymer, a very hard, white, heavy polymer composition is obtained.

In accordance with the process of the invention, polypropylene is heated to a temperature above its melting point. A quantity of titanium dioxide is then incorporated into the molten polymer such as by stirring the titanium dioxide in the molten polymer. The quantity of titanium dioxide to employ depends upon the application of the resulting product. When it is desired to obtain a white polymer product without substantially changing the remaining properties of the polypropylene, from about 0.1% to 1% by weight of titanium dioxide is used. When it is desired to impart uninflammable characteristics to the polymer, at least 0.25% by weight, and preferably from about 0.5% to 4% by weight, of titanium dioxide is used. When a very hard polymer product is desired, from about 4% to 12% by weight of titanium dioxide is compounded with the polypropylene, and the resulting composition is heavy, i.e., a unit volume of the resulting composition is substantially heavier than a like volume of the same polymer without the titanium dioxide.

The titanium dioxide useful in preparing the composition of the present invention is well known as pigment for paints. The titanium dioxide can be in any crystal form and good results obtained therewith, the anatase or rutile forms being preferred. The titanium dioxide can be used as a composite with up to about 50% by weight of calcium sulfate if desired, but generally the titanium dioxide is used in relatively pure form.

The crystalline polypropylene used in the process of the invention is prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 150° C. are suitable. Atmospheric pressure is preferably used although elevated pressures can be used to advantage in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the catalyst during the contacting with the catalyst deactivating liquid. The polymer is then repeatedly washed to remove at least a major proportion of the residual inorganic material from the catalyst, and is then dried. The described procedure yields a product which is a mixture of crystalline and amorphous polypropylene. The amorphous polymer can be removed by dissolution in a hydrocarbon solvent at an elevated temperature, for example, in n-heptane, isooctane, tetralin, decalin or the like. The resulting crystalline polypropylene is then used in the process of the invention. However, a small amount of the amorphous polymer, say up to about 10% by weight, can be present with the crystalline polymer and good results obtained. The crystalline polypropylene will generally have a molecular weight of from about 5,000 to 300,000 and usually from about 50,000 to 250,000, a melting point of from about 161° C. to 170° C., and exhibits a crystalline structure by X-ray analysis.

The compositions of the present invention thus consist essentially of polypropylene having a molecular weight of from about 5,000 to 300,000 and usually from about 50,000 to 300,000, and from about 0.1% to 12% by weight of titanium dioxide. The quantity of titanium dioxide to use as above described is determined by the particular application of the resulting polymer product.

The following examples illustrate the process and compositions of the invention in which "parts" refers to parts by weight unless otherwise indicated.

*Example 1*

Polypropylene was prepared by introducing propylene into a slurry of titanium trichloride and aluminum triethyl in a mixture of paraffin hydrocarbons consisting predominately of paraffins having 8 carbon atoms per molecule. 1 part of titanium trichloride in about 700 parts of the reaction medium was employed. The mole ratio of aluminum triethyl to titanium trichloride was about 0.4:1. The temperature of the reaction mixture was maintained within the range of about 60° C. to 85° C. and the propylene was introduced to give a pressure of from about 200 p.s.i.g. to 250 p.s.i.g. The reaction proceeded for several hours, during which time propylene was periodically introduced to maintain the pressure within the stated range. After the polymerization, the polymer product was washed with 10% nitric acid in isopropyl alcohol to remove a substantial proportion of the catalyst.

The foregoing procedure was repeated several times under comparable conditions and the resulting products were blended to form the polypropylene used in preparing the compositions of the present invention.

The polypropylene had a melting point of 161° C. and a molecular weight of 250,000. A portion of the polypropylene was heated to above its melting point and 10% by weight of titanium dioxide pigment incorporated therein by stirring the titanium dioxide until a homogeneous dispersion thereof in the molten polymer was obtained. On cooling in a mold, the resulting polymer product was very hard, white in appearance, and had a high gloss. Polypropylene heated to the same temperature for the same length of time and cooled in a mold is yellow to brown in color, is relatively soft, and does not have a gloss. The product of the invention, prepared as above described, could be melted but would not ignite even when exposed to the flame of a burner (about 1900° C.).

*Example 2*

Polypropylene prepared as above described was heated to above its melting point and was compounded with 1% by weight of titanium dioxide as described in Example 1. The product was very white and hard, but not brittle. The product was not flammable. When molded at a temperature of 232° C. and a pressure of 5,000 p.s.i.g., the product appeared pure white. Polypropylene molded under the same conditions appears yellowish brown.

The compositions of the present invention which contain relatively small quantities of titanium dioxide, such as quantities which make the polymer incombustible but do not substantially effect other properties, are useful for preparing insulating and packaging materials, especially where such materials may be exposed to elevated temperatures, fire hazards or the like. The compositions of the invention which are extremely hard and heavy, i.e., those compositions which contain relatively large amounts of titanium dioxide, are especially useful for preparing articles by molding, such as containers for fluids, and the like.

The invention claimed is:

1. A process for reducing the flammability of polypropylene, which comprises blending predominantly crystalline polypropylene, having a molecular weight of from about 5,000 to 300,000, with about 0.1 to 12% by weight of titanium dioxide, thereby to produce a solid, moldable, essentially anhydrous composition having reduced flammability.

2. The process of claim 1 wherein said polypropylene has a molecular weight between 50,000 and 300,000 and the quantity of titanium dioxide used is from about 0.25 to 4% by weight.

3. The process of claim 2 wherein said polypropylene is heated to a temperature above its melting point and said titanium dioxide is added thereto.

4. The process of claim 1 wherein said polypropylene has a molecular weight of from 50,000 to 300,000 and the quantity of titanium dioxide added thereto is from about 4 to 12% by weight.

5. The process of claim 4 wherein said polypropylene is heated to a temperature above its melting point and said titanium dioxide is added thereto.

References Cited in the file of this patent

UNITED STATES PATENTS

| | | |
|---|---|---|
| 2,395,922 | Timmons | Mar. 5, 1946 |
| 2,656,295 | Locke | Oct. 20, 1953 |
| 2,731,453 | Field et al. | Jan. 17, 1956 |
| 2,749,248 | Benson | June 5, 1956 |
| 2,822,341 | Miller et al. | Feb. 4, 1958 |
| 2,876,133 | Iler et al. | Mar. 3, 1959 |
| 2,984,634 | Caldwell et al. | May 16, 1961 |

FOREIGN PATENTS

| | | |
|---|---|---|
| 604,695 | Great Britain | July 8, 1948 |
| 771,955 | Great Britain | Apr. 10, 1957 |
| 538,782 | Belgium | Dec. 6, 1955 |